United States Patent [19]

Kolze et al.

[11] Patent Number: 4,863,098
[45] Date of Patent: Sep. 5, 1989

[54] FLOW MODULATING CONTROL VALVE ASSEMBLY

[76] Inventors: Lawrence A. Kolze; Barbara J. Kolze, both of 437 S. Addison St., Bensenville, Ill. 60106

[21] Appl. No.: 188,839

[22] Filed: May 2, 1988

[51] Int. Cl.⁴ .................. G05D 23/13; F16K 31/40
[52] U.S. Cl. .......................... 236/12.12; 137/88; 236/12.15; 251/30.03
[58] Field of Search ............. 137/88; 251/30.03, 35, 251/39, 129.08; 236/12.12, 12.15

[56] References Cited

U.S. PATENT DOCUMENTS

| 1,368,251 | 2/1921 | Ehrhart | 251/39 X |
| 3,415,269 | 12/1968 | Salerno | 251/35 X |
| 3,423,062 | 1/1969 | Grayson | 251/30.03 |
| 3,642,199 | 2/1972 | Halkema | 251/35 X |
| 3,684,238 | 8/1972 | Michellone et al. | 251/129.08 X |

Primary Examiner—Stephen Hepperle

[57] ABSTRACT

A pilot operated flow modulating control valve assembly with a pilot valve to initiate opening and closing of a main control valve, and a secondary valve for separately controlling pressure across the control valve to achieve its modulated positions.

22 Claims, 4 Drawing Sheets

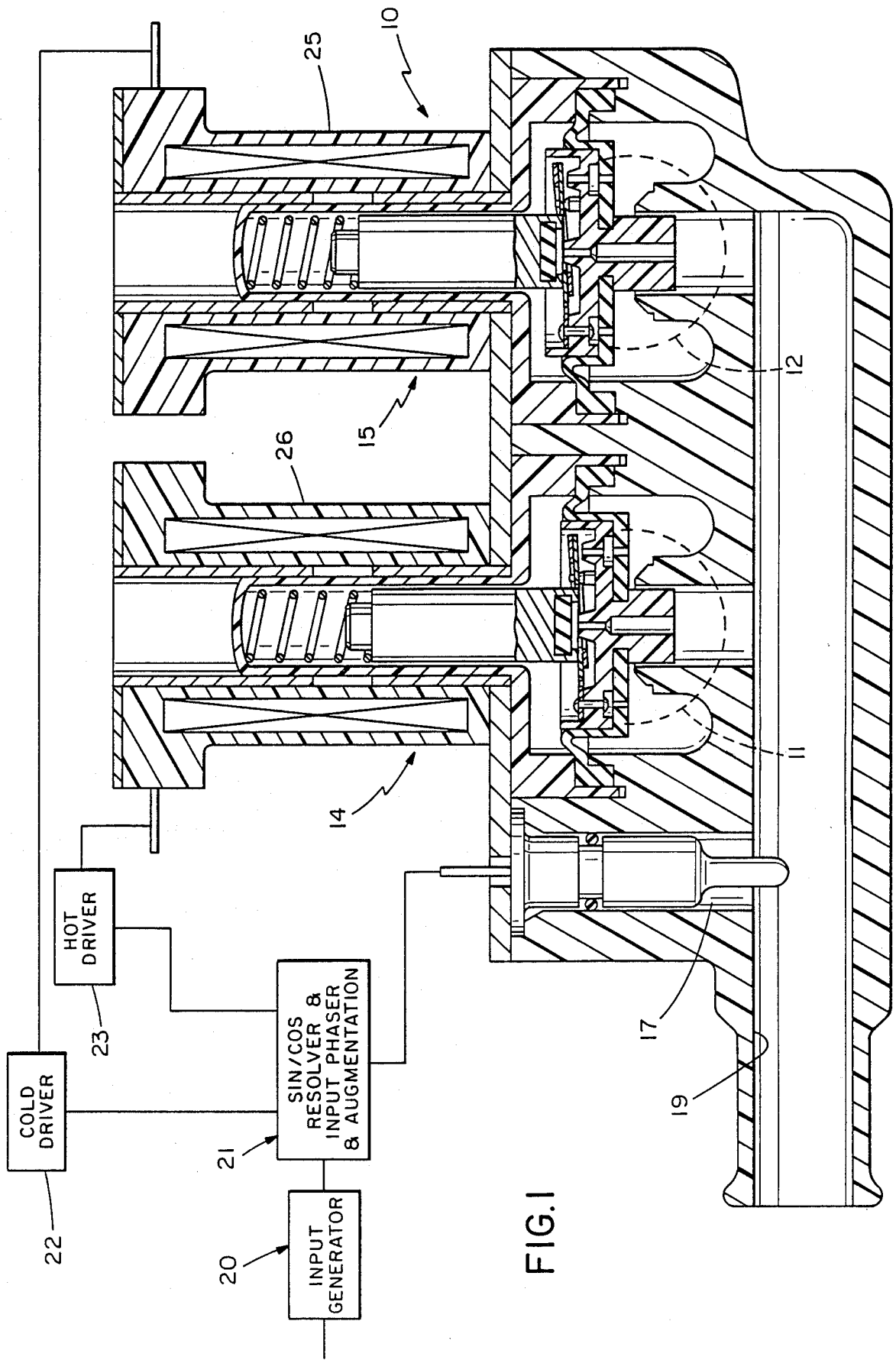

FLOW MODULATING CONTROL VALVE ASSEMBLY

BACKGROUND OF THE INVENTION

Mixing valve assemblies have been used in the past for many years in clotheswashing machines for mixing predetermined proportions of hot and cold water to provide the appliance with the desired temperature water, as well as controlling the flow rate of the water supplied.

Typically, these mixing valves include two diaphragm operated valves, one for cold water and one for hot water with some type of control system for actuating either the hot or cold water valve, or for actuation of both valves to give a mix of the hot and cold fluids. These valves are very limited in mix temperature control due to effects of different inlet pressures of the hot and cold, water temperature variables, and different flow pressure drops through each section of the mixing valve itself. Thus, outlet mix temperature of these valves is solely dependent upon whatever the full flow hot and cold valves will provide for the given variables and, therefore, little control of actual mix temperature is achieved.

Other previous mixing valves did provide control of the hot and cold mix temperature through a mechanical sensor/actuator which provided a selectivity of mix temperatures achieved by proportioning the hot and cold fluids from the solenoid operated valves in a mechanically proportioning mixing chamber. In these mixing valves, the hot and cold pilot operated valves were also either fully "on" or "off" and depended upon the thermostatically controlled mixing chamber to achieve some desired degree of mix temperature.

In the past these valves have included pilot operated diaphragm valves with actuators that control on/off flow through a pilot passage extending through the diaphragm and the position of this actuator has been controlled by an electromagnet. These prior diaphragm operated valves, however, have been found only useful in positioning the main diaphragm valve in either a fully opened or fully closed position because attempts in attaining modulating capability of these valves at the pilot valve orifice has been unreliable since the pilot valve under these conditions has been found to have an inherent propensity to inadvertently close and cause premature main valve closure, especially upon transient current or voltage surges through the electromagnetic coil or because of transient pressure surges at the valve inlet.

One such pilot operated diaphragm valve is disclosed in the McCarty, Jr., et al., U.S. Pat. No. 3,672,627, and it includes a diaphragm operated main valve for controlling flow between an inlet and an outlet with one side of the diaphragm being exposed to inlet pressure and the opposite side of the diaphragm forming an intermediate chamber in the housing in which fluid pressure is controlled by an electromagnetic coil driven actuator reciprocal in the housing having a pilot seal at its inner end that selectively blocks flow through a central pilot passage in the main diaphragm valve.

With the electromagnetic coil de-energized, the actuator is biased by a coil spring to close this pilot passage and when fluid is introduced at the valve inlet, it is free to move into this intermediate chamber through a continuously open small offset passage extending through the diaphragm.

The intermediate chamber is then at a higher pressure than the outlet and the main diaphragm valve assembly is urged to its shut-off position due to the differential area caused by the main valve seat and the biasing force of the coil spring acting on the electromagnetic actuator armature.

When the windings of the electromagnetic coil are energized, the magnetic flux generated thereby moves the ferromagnetic actuator away from the diaphragm against the biasing force of the coil compression spring and fluid differential pressure force to unseat the pilot seal from the pilot passage in the diaphragm permitting flow through the pilot passage from the intermediate chamber to the outlet. This, of course, results in a reduction in pressure in the intermediate chamber and when the fluid pressure differential acting on the lower side of the diaphragm and the upper side of the diaphragm (intermediate chamber pressure) is sufficient, the diaphragm assembly, and hence the main valve will move upwardly away from the main valve seat permitting high pressure fluid to flow directly from the inlet to the outlet.

Because of the high initial current flow through the coil required to raise the actuator against the bias spring force and pressure differential force and cause opening movement of the main diaphragm valve assembly, the actuator will continue to move a considerable distance away from the diaphragm assembly until the magnetic actuation forces reach equilibrium with the spring force. This equilibrium point positions the actuator almost entirely within an associated guide bore in the coil assembly so that there is no modulation or restriction between the actuator seal and the pilot passage during this movement. The following diaphragm assembly then moves away from the main valve opening until it abuts a stop.

While the McCarty, et al. valve has been employed commercially solely as an on-off flow control valve as completely described in their patent, there have been unsuccessful experimental attempts to utilize the McCarty, et al. valve as a flow modulating valve. In these attempts, current flow through the coil was reduced after the initial high current flow to overcome the forces acting on the closed actuator, permitting the actuator to move downwardly as a result of the diminution in the flux field acting on the actuator. As the actuator and its pilot seal move toward the pilot passage, the differential pressure between the valve inlet and the intermediate chamber is reduced to achieve main flow modulation. The pressure drop across the pilot seal however, increases due to the flow restriction caused by the close proximity of the pilot seal to the pilot passage. The proximity of the pilot seal to the pilot passage is critical to where modulation of the main valve can be maintained without the pressure drop force across the pilot seal increasing to a valve wherein an inadvertent shut-off the pilot passage occurs.

Because the main valve appeared to follow the actuator, the McCarty, et al. diaphragm valve assembly, at first blush, appeared capable of operating as a modulating valve with the appropriate reduction of coil current after opening. However, testing the McCarty, et al. valve in attempted modulating positions, particularly when a high differential pressure exists across the diaphragm, indicated the valve assembly to be very unstable not only under transient changes in inlet pressure, and transient current surges through the coil, but when tried under most controlled coil voltages and pressures.

I have found this instability to result from the close proximity of the actuator pilot seal from the pilot passage in the main diaphragm valve assembly when the actuator and valve are attempted to be put into a modulating equilibrium position. In an exemplary modulating equilibrium position, the main valve assembly is open and the actuator seal is closely spaced to the diaphragm pilot passage so that its pilot seal is restricting flow through the pilot passage. The pilot actuator is stationary because the electromagnetic flux force is held constant for that position and is balanced by the force of the spring and the axial differential pressure acting thereon. At this time the diaphragm is in a stationary position because the differential pressures acting on the diaphragm's upper and lower surfaces produces a force balance.

The requirement for the seal being very close to the pilot opening in this balance position is due to the fact that the seal must be this close to sufficiently restrict pilot flow through the pilot passage to achieve the proper balance of forces acting on the main valve. The instability is also accentuated by the fact that there is a net downward differential pressure force acting on the actuator in this equilibrium position urging it to its closed position blocking flow through the pilot passage of the valve. This net differential pressure force is caused by the restriction established at the actuator seal area of the diaphragm pilot passage and acts across the area of the actuator seal immediately adjacent the pilot orifice to create a downward force on the actuator. In this nearly closed position of the actuator seal, any transient increase in inlet or intermediate chamber pressure increases the differential pressure and downward force acting on the actuator frequently causing inadvertent shut-off. The same result occurs from a transient drop in coil current.

While the McCarty, et al. valve is an excellent design for an on-off valve for which it is intended when originally designed, the tendency of the pilot valve to inadvertently close is unacceptable in a modulating valve since it drives the main valve to a closed position when it is not desired.

It is a primary object of the present invention to ameliorate the problems noted above in the pseudo modulating valve described and particularly to provide an improved state of the art appliance clotheswasher mixing valve which will provide superior mix temperature control over presently used valves in these applications.

SUMMARY OF THE PRESENT INVENTION

In accordance with the present invention, a mixing valve assembly for hot and cold liquids is provided that includes two pilot operated variable flow modulating control (main) valves each with an electromagnetic armature driven pilot valve to initiate opening and closing of the control valve and a secondary valve for separately controlling pressure drop across the control valve to achieve its equilibrium modulated positions.

The mixing valve herein described overcomes the limitations of the past and present type mixing valves by providing each of the hot and cold solenoid valves with a variable flow capability so that the hot and cold fluid flow through each of the valves can be proportioned to provide the desired outlet mix temperature. The desired amount of flow through each of the hot and cold solenoid valves is achieved by the modulated position of each valve in accordance to a temperature sensor feedback signal to the solenoid valve actuators.

Toward these ends, each of the pilot operated valves according to the present invention includes a control valve assembly that defines the main flow valve and also separates the associated housing into an inlet chamber and an intermediate chamber with inlet fluid pressure tending to open the valve and intermediate fluid pressure tending to close the valve.

A pilot passage positioned centrally in the control valve assembly interconnects this intermediate chamber with the outlet, and this pilot passage is selectively opened and closed, but not modulated or restricted, by a pilot valve seal on the lower end of an armature-actuator which is linearly positioned within the valve by an electromagnetic coil in opposition to the closing biasing force of a coil compression spring.

The modulating flow positions of the control valve assembly are controlled by varying the pressure in this intermediate chamber with a secondary valve mechanically operated by the actuator. In one embodiment of the present invention, this secondary valve consists of an offset passage extending through the control valve assembly interconnecting the inlet chamber and the intermediate chamber. Intermediate chamber pressure is always equal to or less than inlet pressure. Intermediate chamber fluid pressure is controlled by this secondary valve by restricting flow from the inlet chamber to the intermediate chamber.

In this first embodiment, the offset fluid passage is variably restricted by a pivotally mounted valve plate on the rear side or intermediate chamber side of the valve assembly, operated by direct engagement with the actuator. With the appropriate selection of the lever arm of this pivotal valve, the force of the actuator on the pivotal valve blade is amplified so that a lower coil current is utilized to position this secondary valve. The pivotal valve also desensitizes the armature/actuator position during modulation of the secondary valve so that greater excursions of the actuator movement can be tolerated without large changes of pressure drop variations occurring across the control valve. This feature tends to stabilize the control valve to a given position and also allows a larger tolerance of actuator position. The actuator urges the pivotal member to its open position and a generally circular blade leaf spring fixed to the control valve continuously biases the secondary valve toward its closed position blocking flow through the secondary offset control valve passage.

An important aspect of the present invention is that the actuator pilot seal functions only to initiate opening and closing movement of the main valve and does not modulate pressure in the intermediate chamber, which, as described above, is performed by the secondary valve. Because of this, the actuator, and particularly the actuator pilot seal, is by design, positioned sufficiently far away from the central pilot passage in the control valve assembly so that when the secondary valve is modulating or restricting the offset passage, it is unaffected by pilot passage pressure or pressure differential forces and, hence there is no significant differential fluid pressure force acting on the actuator when the control valve is open. Since the differential pressure force acting on the actuator remains essentially zero during modulation, transient changes in intermediate chamber pressure create no imbalance of the forces acting on the actuator and hence no unwanted downward pilot actuator forces. It should be noted that the force balance and position of the control valve utilizing the secondary valve is inherently stable. That is, whenever transient conditions occur to upset the desired force balance across the control valve, the secondary valve either opens or restricts to change the intermediate chamber pressure. This causes movement of the control valve in a direction opposite to the disturbing transient so that the correct control valve force balance is always maintained.

Furthermore, the significant spacing of the actuator pilot seal from the pilot passage also reduces the likelihood of other factors causing inadvertent downward relative movement of the actuator including transient inlet fluid pressure rise and transient current dips in the coil.

According to another embodiment of the present invention, the pivotal secondary valve is replaced with a valve disk fixed to the lower end of the actuator that actuates a poppet valve reciprocably mounted in a stepped bore in the valve assembly interconnecting the inlet chamber and the intermediate chamber. This embodiment operates in the same manner and has the same advantages of the pivotal secondary valve in the first embodiment except for the mechanical advantage achieved by the pivotal valve. In the second embodiment, however, no spring is required to bias the secondary poppet valve to its closed position since the valve is constructed to be flow responsive and is made of a lightweight plastic to achieve buoyancy toward the valve closed position. However, a spring may be used as a retainer for the secondary valve or for added closing bias force if desired.

It should be understood that the present flow modulating pilot operated valve assembly is particularly useful when used in a mixing valve environment because heretofore simple dual hot and cold water modulating valves have not been feasible or available in hot and cold water mixing controls for the home appliance market. However, it should be understood that the present valve used singularly or in tandem has applicability in other applications where simple, reliable low-cost fluid flow modulation is desired.

Other objects and advantages of the present invention will appear from the following detailed description.

BRIEF DESCRIPTION OF THE DRAWINGS

FIG. 1 is a longitudinal sectional through a mixing valve assembly according to the present invention with the controls and drivers therefore illustrated in block diagram form;

DETAILED DESCRIPTION OF THE PREFERRED EMBODIMENTS

Figures 2, 2A:
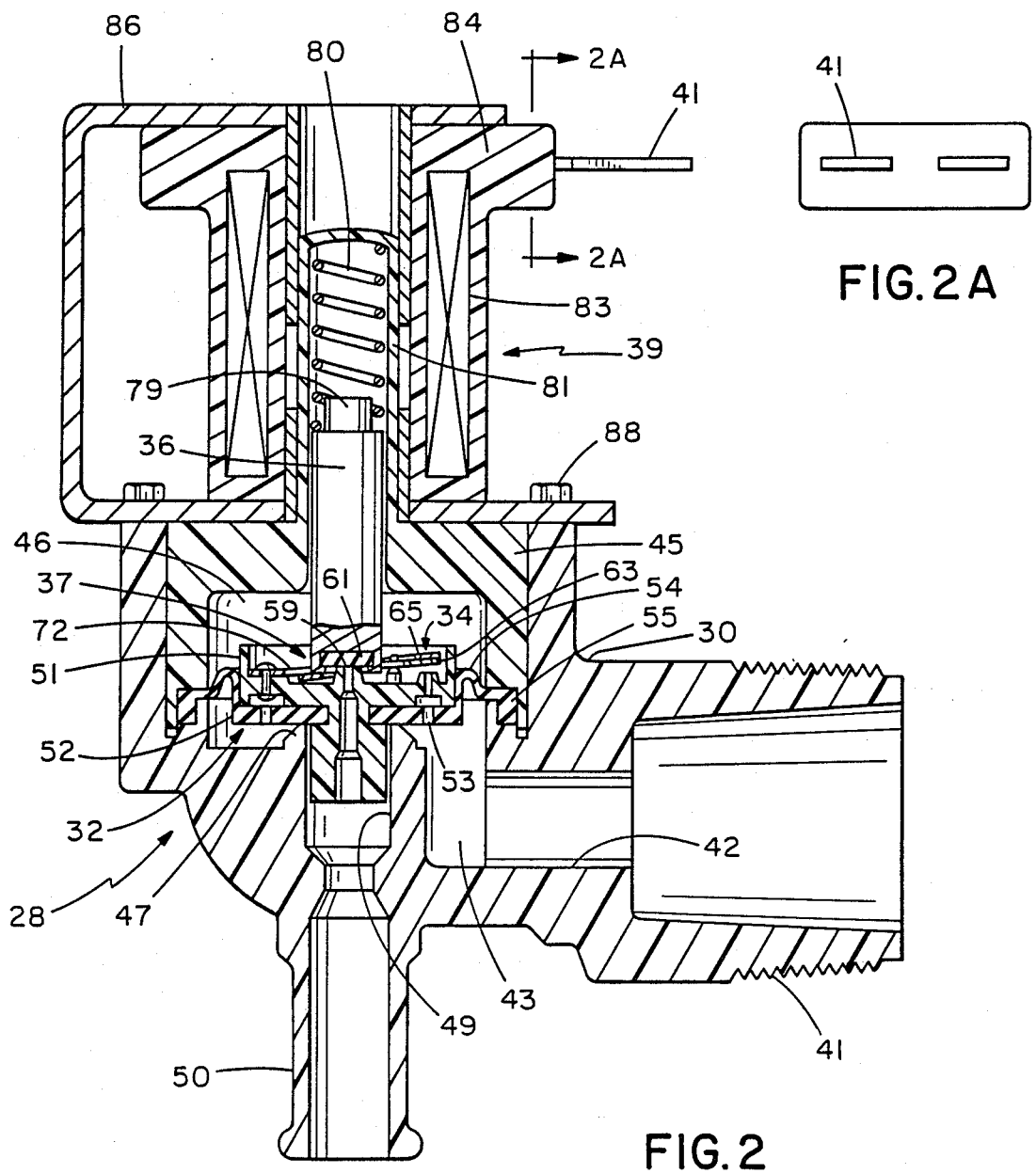
FIG. 2 is a longitudinal section through a single flow modulating pilot operated control valve assembly according to the present invention embodying a single valve as opposed to the dual mixing valves illustrated in the FIG. 1 embodiment and is illustrated showing the pivotal valve in its full open position and the pilot valve and control (main) valve closed.
FIG. 2A is a cross section taken generally along line 2A—2A of FIG. 2 showing insert molded terminals for the electromagnetic coil.
Figure 3:
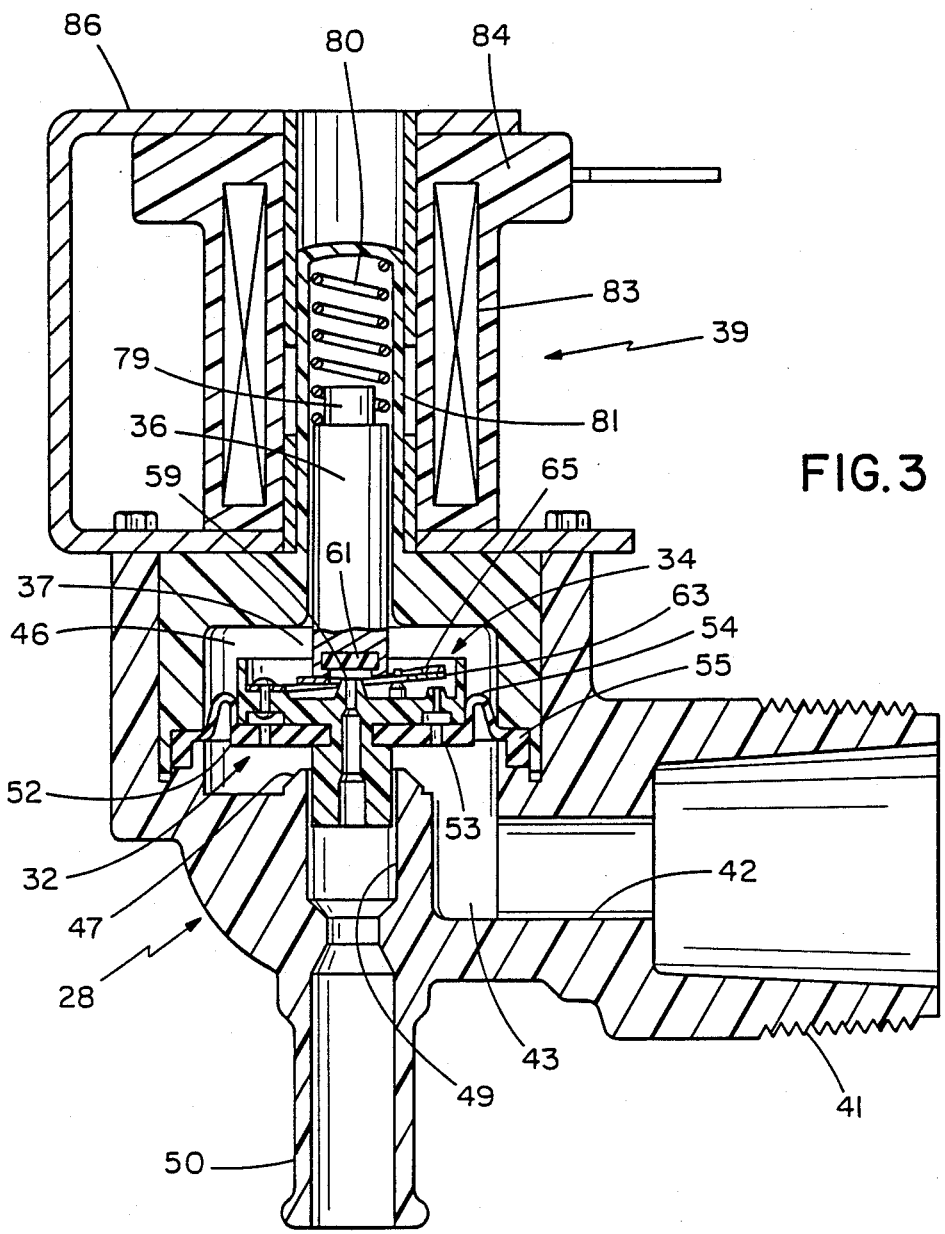
FIG. 3 is a longitudinal section similar to FIG. 2 with the valve in its modulating equilibrium position.

Referring to the drawings and particularly FIG. 1, a mixing valve assembly 10 is illustrated generally adapted to mix cold water from a cold water inlet 11 with hot water from a hot water inlet 12 to provide water to an associated appliance at a pre-selected temperature as desired.

Mixing valve 10 generally includes a fluid flow modulating pilot operated control valve assembly 14 for controlling cold water flow and an identical flow modulating valve assembly 15 for controlling hot water flow, and a temperature sensor 17 projecting into an outlet passage 19 where hot and cold water from valves 14 and 15 mix.

The valves 14 and 15 are controlled by an electronic circuit that includes an Input Generator 20 for deriving variable signals representing the desired temperature, a SIN/COS Resolver and Input Phaser 21 that receives actual temperature signals from the temperature sensor 17 and provides DC signals to cold driver 22 and hot driver 23 which respectively provide the appropriate coil current for electromagnetic coil assemblies 25 and 26 associated with the valves 15 and 14 respectively.

The valves 14 and 15 are identical and, thus will be described in detail with respect to the embodiment shown in FIGS. 2 to 6 which illustrate the present flow modulating valve as a single valve unit, but it should be understood in connection with the FIG. 1 embodiment, as well as the remaining embodiments, that the control valve assembly according to the present invention is capable of infinite modulation of fluid flow within the range of motion of the control valve assembly, and this characteristic is useful in a wide variety of applications and is particularly useful in the two valve mixing valve assembly illustrated in FIG. 1.

The Input Generator 20 develops a pulse train that is phase responsive to an input representing the desired temperature water from outlet passage 19. The SIN/COS Resolver and Input Phaser 21 derives SIN and COS signals that are phased with the pulse train from the input generator 20. The SIN/COS Resolver also phases a pulse train in response to the magnitude of input from the temperature sensor 17 and utilizes this actual temperature sensor pulse train to pick off the DC instantaneous values of the phased SIN and COS signals and utilizes these two as inputs to the cold driver 22 and the hot driver 23. Such SIN/COS Resolvers are conventional and, therefore, the details of the circuitry are unnecessary to the present invention.

A further function of the SIN/COS Resolver 21 is to provide high predetermined signals to the cold driver 22 and the hot driver 23 upon the initial appearance of a signal from Input Generator 20. After a pre-determined short period, signals from the SIN/COS Resolver to the cold driver and the hot driver switch to the levels dictated by the pulse train from Input Generator 20 and the signal from the temperature sensor 17.

The reason for this is that the actuators in the valves 14 and 15 require a high opening force to move them from their closed positions. This will be explained more fully in connection with the embodiment shown in FIGS. 2 to 6. Note that both actuators are open in FIG. 1, and the actuator illustrated in FIG. 2 is closed. Note also in FIG. 1, the main valve or valve 15 is opened greater than the main valve of valve 14 to illustrate operation of the mixing valve in proportioning the flows of the hot and cold fluid into the mix chamber 19.

The mixing valve 10 is capable of providing an infinite combinations of cold water flow rate from valve 14 and hot water flow rate from hot water valve 15 in an improved manner heretofore not capable in known hot and cold water appliance type mixing valves.

Reference now turns to the embodiment illustrated in FIGS. 2 to 6 which shows a single flow modulating pilot operated valve assembly 28 according to the present invention and it can be readily seen that the operating components thereof are identical to those in the valves 14 and 15 in the FIG. 1 embodiment, so that the following description of valve 28 applies to the valves 14 and 15 in FIG. 1 as well.

Valve 28 generally includes a housing body 30, a main modulating valve assembly 32 reciprocal vertically within body 30, a secondary modulating valve assembly 34 operated by an armature-actuator 36, an on-off pilot valve 37, and an electromagnetic coil assembly 39 for positioning armature-actuator 36 in any incremental vertical position within its range of movement in accordance with the magnitude of the current in its coil. Coil current is applied to coil assembly 39 through terminals 41.

The body 30 is constructed of a suitable plastic, such as polypropylene and includes an inlet fitting 41 having an inlet passage 42 connected to an inlet chamber 43 so that the pressure of inlet fluid flowing in chamber 43 tends to bias diaphragm assembly 32 upwardly. Assembly 32 defines in housing cover member 45 an intermediate chamber 46 and fluid pressure in intermediate chamber 46 tends to bias the diaphragm assembly 32 downwardly toward its closed position in engagement with an integral main valve seat 47 in the housing coaxial with a stepped outlet passage 49 communicating with an integral downwardly projecting outlet fitting 50.

The assembly 32 includes an annular rigid plastic insert 51 fixed to the upper surface of a flexible diaphragm 52 that includes a thick fairly firm central portion 53, a bellows portion 54, and an annular flange portion 55 that is clamped between the cover 45 and the housing body 30.

Figure 4:
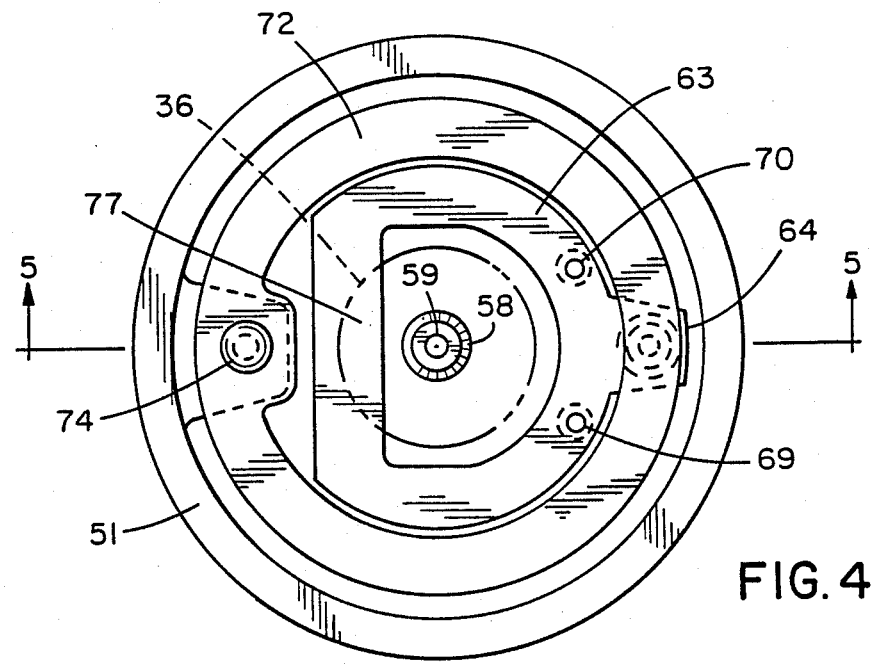
FIG. 4 is an enlarged sub-assembly of the top of the control valve assembly illustrated in FIG. 3 showing the pivotal mounting of the plate valve.
Figure 5:
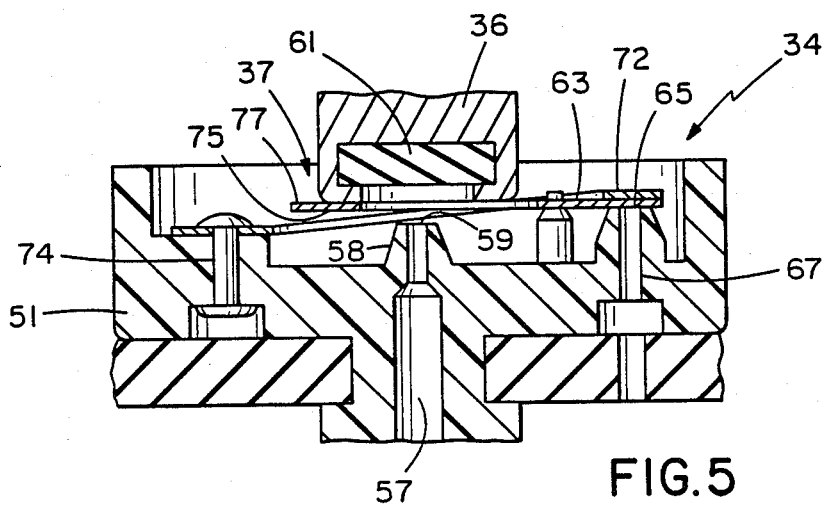
FIG. 5 is a fragmentary cross section of the control valve assembly illustrated in FIG. 5 with the pilot valve open and the secondary valve closed.
Figure 6:
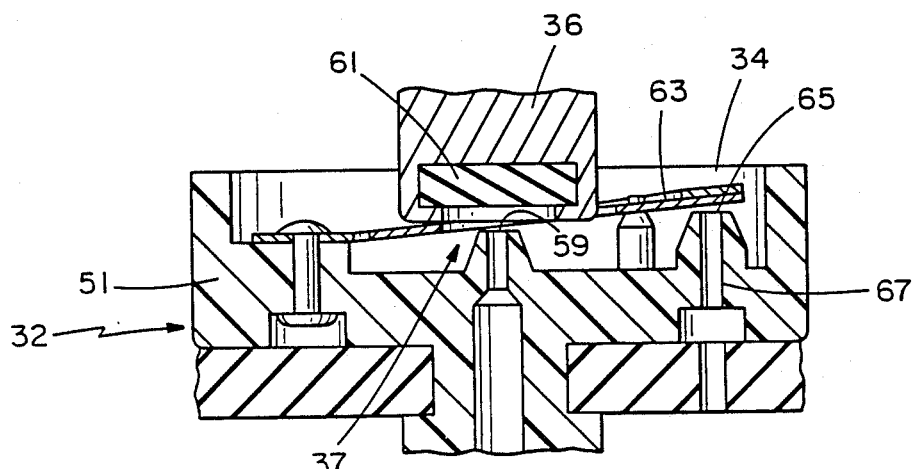
FIG. 6 is a fragmentary cross section of the control valve assembly similar to FIG. 5 with the secondary valve in its modulating position.

As seen more clearly in FIGS. 4, 5 and 6, the insert 51 has a central stepped pilot passage 57 therethrough that communicates the intermediate chamber 46 with the outlet passage 49, and it opens at its upper end through a frustoconical projection 58 at orifice 59. Orifice 59 is selectively blocked by an elastomeric seal 61 carried by the lower end of actuator 36, and this selective blocking function constitutes the on-off valving action of the pilot valve 37. The sole function of pilot valve 37 is to open and close the main valve 32 and not to provide the means modulate the main valve in its intermediate positions.

The secondary valve assembly 34 includes a flat generally "D" shaped plate valve element 63 shown clearly in FIGS. 4 and 5, that has a radially outward projection 64 for restricting flow from chamber 43 to chamber 46 through an orifice 65 forming the outlet of a passage 67.

Plate valve 63 is pivoted on two projections 69 and 70 on the insert 51 that extend through complementary apertures in the plate valve 63.

Plate valve 63 is biased to its closed position by an annular flat leaf spring 72 fixed at one side to the insert 51 by a rivet 74, and it surrounds valve plate 63 and engages the top of the valve plate projection 64 at its other end.

As seen clearly in FIG. 5, the lower left end 75 of the actuator 36 engages valve plate cross bar 77 to pivot the valve plate away from the orifice 65 in opposition to the biasing force of spring 72 as the actuator 36 moves downwardly, and conversely, as the actuator 36 moves upwardly, leaf spring 72 moves the valve plate 63 toward its closed position over orifice 65.

The shorter distance between the pivot projections 69 and 70 and the orifice 65 compared to the far greater distance between the pivot projections 69 and 70 and the engagement point of the crossbar 77 with the actuator 36 creates a force amplification that reduces the necessary electromagnetic flux force on the actuator 36 to operate secondary valve 34, and thus, the coil has a lower power consumption.

Referring to FIG. 2, the armature-actuator 36 is cylindrical in configuration and has a reduced upper projection 79 that forms a seat for a coil compression spring 80 seated in a closed ended actuator guide tube 81 formed integrally with cover 45. Spring 80 urges actuator 36 toward its closed position in engagement with pilot valve orifice 59 on the insert 51, and operates in opposition to the electromagnetic flux force created by coil assembly 39 which urges the actuator upwardly into guide tube 81.

The coil assembly 39 includes a coil 83 encased in a molded housing 84 carried by a channel shaped frame 86 fixed to the body 30 by a plurality of fasteners 88.

With no current flowing in coil assembly 39, spring 80 biases actuator 36 downwardly to its position where the pilot valve 37 is closed as illustrated in FIG. 2, which shifts the secondary valve 34 to its fully open position. When inlet fluid is applied to inlet chamber 43, it flows through the open secondary valve 34 into intermediate chamber 46 so that the pressure in chambers 43 and 46 are equal. Since the outlet passage is at a lower pressure than chamber 46, there is a net differential force on the valve assembly 32 tending to maintain that valve closed under these conditions.

At the same time, the actuator 36 also exerts a downward force on the pilot orifice 59 tending to keep it closed. This downward force is a result of both the differential spring force between the stronger spring 80 and secondary valve spring 72 and also as a result of differential pressure between chamber 46 and pilot passage 57 acting on actuator.

The differential pressure acting on actuator 36 is the reason the SIN/COS Resolver provides higher initial energizing current for initial valve opening. The differential pressure tending to hold actuator 36 down against its pilot valve 37 in the closed non-flowing position illustrated in FIG. 2 is a result of the fact that pilot passage 57 is at its lowest outlet pressure and chambers 43 and 46 are at their highest pressures at this time.

Upon the application of the high initial current flow to coil assembly 39, actuator 36 moves upwardly away from pilot orifice 59 to a position out of engagement with the crossbar 77, i.e; significantly further upwardly from the position of actuator 36 illustrated in FIG. 5 or FIG. 6.

This movement causes the pilot valve 37 to be fully open and secondary valve 34 to close permitting fluid in intermediate chamber 46 to flow into the outlet through the pilot passage. The resulting decrease in pressure in intermediate chamber 46 reverses the differential forces acting on the diaphragm valve 32 moving the diaphragm upwardly and opening the main valve seat 47 to its maximum opening position and permitting fluid flow directly from the inlet chamber to the outlet passage 49.

After the predetermined duration of the original augmented current flow to coil 39, current flow is reduced to the level dictated by the applied input signal representing a predetermined valve open or flow position.

As the actuator 36 moves downwardly to its position dictated by coil current, it pivots valve plate 63 upwardly to the position shown in FIG. 6 opening the secondary passage 67 permitting inlet flow from chamber 43 into intermediate chamber 46 increasing the pressure in that chamber toward inlet pressure until the differential forces acting on valve assembly 32 reverse, beginning a movement of the valve assembly 32 downwardly toward its closed position. This movement causes the valve 63 to move toward its closed position restricting flow from chamber 43 to chamber 46 until the forces balance on the valve assembly 32. If the valve assembly 32 overshoots the balance position when moving downwardly, the secondary valve 34 will further restrict and throttle flow through passage 67 causing a decrease in pressure in chamber 46 which results in an upward movement of the diaphragm assembly 32 to its desired force balanced position.

From this modulated equilibrium position, if an increase in current is applied to coil assembly 39 representing a desired increase in flow to a higher value, actuator 36 moves upwardly to its new position causing secondary valve 34 to close resulting in upward following movement of the main diaphragm valve 32 until cross member 77 of the valve plate 63 again engages the plunger and the valve 63 modulates orifice 65 to move the valve assembly 32 to its new equilibrium force balanced position.

An important aspect of the present invention is that when the diaphragm valve assembly is in its equilibrium position with respect to actuator 36 as seen in FIG. 6, the seal 61 is spaced sufficiently far away from the orifice 59 so that the actuator 36 does not see the pressure drop at the orifice 59 and, hence, there is no significant pressure differential acting on the actuator to cause port 59 to close as in priorly described pilot operated diaphragm valves of this general type.

Figures 7, 8:
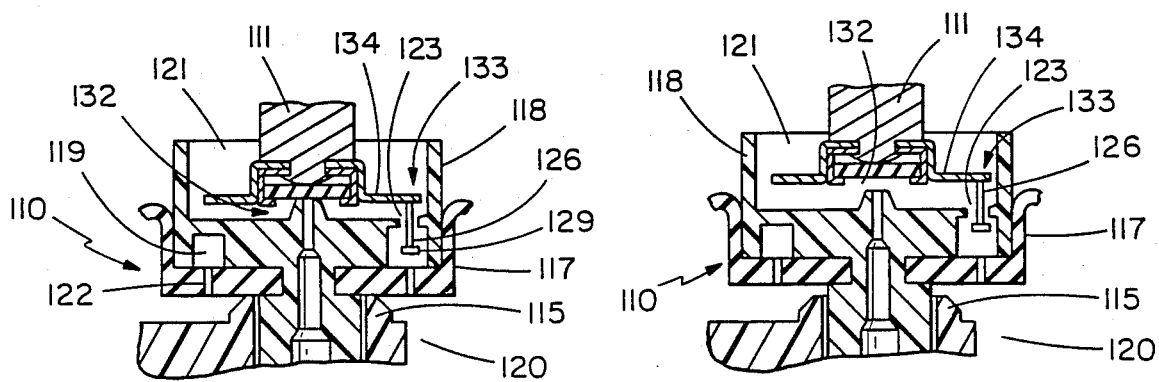
FIG. 7 is a fragmentary section of another embodiment of the present control valve assembly with the pilot valve closed and the secondary valve open.
FIG. 8 is a fragmentary section similar to FIG. 7 with the pilot valve open and the secondary valve in its modulating equilibrium position.

A third embodiment of the present invention is illustrated in FIGS. 7 and 8 shown in fragmentary form in these two views with the understanding that the housing body, cover and electromagnetic coil assembly in this embodiment are the same as in the FIGS. 2 to 6 embodiment.

With that understanding, the FIGS. 7 and 8 valve assembly is seen to include a main valve assembly 110 positioned in accordance with the position of actuator 111 as dictated by its associated electromagnetic coil assembly. Valve assembly 110 cooperates with an annular main outlet seat 115 in the same manner as in the FIGS. 2 to 6 embodiment and includes an incompletely shown diaphragm 117 attached to an annular insert 118 having an annular passageway 119 therein that communicates inlet chamber 120 with intermediate chamber 121 through passageways 122 in diaphragm 117 and a valve aperture 123. A poppet valve 126 biased to close aperture 123 and is reciprocal in the insert and is adapted to restrict and unrestrict aperture 123 as it moves upwardly and downwardly in the insert.

The poppet valve 126 is constructed of a very lightweight plastic of a lower specific gravity than the fluid being handled so that its floatation characteristics along with the flow induced pressure differential force across valve 126 biases it to move toward its position of maximum restriction (upwardly) in response to flow from inlet chamber 120 to intermediate chamber 121. This valve has a pilot valve arrangement 132 identical to pilot valve 37 in the FIGS. 2 to 6 embodiment, and the poppet valve 126 and the aperture 123 define a secondary valve 133 that operates in a similar manner to secondary valve 34 in the FIGS. 2 to 6 embodiment. Poppet valve 126 is shifted downwardly by an annular disk 134 fixed to the lower end of the actuator 111. Not shown in FIGS. 7 and 8, but understandably apparent from the preceding description, further bias of valve 126 toward the closure of aperture 123 could also be accomplished by an annular flat leaf spring similar to the leaf spring 72 of FIGS. 1 to 6 and positioned similarly as spring 72, but contained within the annular passage 119.

The valve assembly of FIGS. 7 and 8 operates in the same manner to shift the valve assembly 110 to its equilibrium position as the FIGS. 1 to 6 embodiment with the exception that it does not include the force amplification provided by the pivotal plate valve 63 therein.

What is claimed is:

1. A control valve assembly designed to modulate fluid flow as desired between an inlet and an outlet, comprising: housing means having an inlet and an outlet, a control valve reciprocably mounted in the valve housing and operable to control flow between the inlet and the outlet, pilot passage means through the control valve communicating the outlet with the opposite side of the control valve, an actuator reciprocably mounted in the fluid flow in the housing having a valve seal selectively blocking or opening flow through the pilot passage, said actuator being movable to a plurality of positions, said actuator and control valve being constructed so the control valve follows infinitely the position of the actuator to variably control flow between the inlet and the outlet, and means for reducing differential pressure acting on the actuator to minimize the tendency of the actuator seal to close the pilot passage including means to control the differential pressure across the control valve without the actuator valve seal whereby the actuator seal does not modulate flow through the pilot passage during control valve modulation.

2. A control valve assembly designed to modulate fluid flow as desired between an inlet and outlet, comprising: housing means having an inlet and an outlet, a control valve reciprocably mounted in the valve housing and operable to control flow between the inlet and the outlet, pilot passage means through the control valve communicating the outlet with the opposite side of the control valve, an actuator reciprocably mounted in the fluid flow in the housing having a valve seal selectively blocking or opening flow through the pilot passage, said actuator being movable to a plurality of positions, said actuator and control valve being constructed so the control valve follows infinitely the position of the actuator to variably control flow between the inlet and the outlet, and means for minimizing the tendency of the actuator to close the pilot passage inadvertently including means to control the differential pressure across the control valve separately from the actuator seal.

3. A control valve assembly designed to modulate fluid flow as desired between an inlet and an outlet, comprising: housing means having an inlet and an outlet, a control valve reciprocably mounted in the valve housing and operable to control flow between the inlet and the outlet, pilot passage means through the control valve communicating the outlet with the opposite side of the control valve, an actuator reciprocably mounted in the fluid flow in the housing having a valve seal selectively blocking or opening flow through the pilot passage, said actuator being movable to a plurality of positions, said actuator and control valve being constructed so the control valve follows infinitely the position of the actuator to variably control flow between the inlet and the outlet, means for reducing differential pressure acting on the actuator to minimize the tendency of the actuator seal to close the pilot passage including means to control the differential pressure across the control valve without the actuator valve seal whereby the actuator seal does not modulate flow through the pilot passage during control valve modulation, and an electromagnetic coil for moving the actuator away from the control valve to open flow through the pilot passage and a spring for urging the actuator toward the control valve toward a position to block flow through the pilot passage, said electromagnetic coil positioning said actuator in accordance with the magnitude of current in its coil whereby the control valve will follow the position of the actuator to variably control flow between the inlet and outlet.

4. A control valve assembly designed to modulate fluid flow as desired between an inlet and an outlet, comprising: housing means having an inlet and an outlet, a control valve reciprocably mounted in the valve housing and operable to control flow between the inlet and the outlet, pilot passage means through the control valve communicating the outlet with the opposite side of the control valve, an actuator reciprocably mounted in the fluid flow in the housing having a valve seal selectively blocking or opening flow through the pilot passage, said actuator being movable to a plurality of positions, said actuator and control valve being constructed so the control valve follows infinitely the position of the actuator to variably control flow between the inlet and the outlet, and means for reducing differential pressure acting on the actuator to minimize the tendency of the actuator seal to close the pilot passage including means to control the differential pressure across the control valve without the actuator valve seal whereby the actuator seal does not modulate flow through the pilot passage during control valve modulation, the means to control the differential pressure across the control valve including a secondary valve selectively and variably restricting flow between the opposite sides of the control valve.

5. A control valve assembly designed to modulate fluid flow as desired between an inlet and outlet, as defined in claim 4, wherein the secondary valve is operated by the actuator, said actuator when engaging the secondary valve to variably restrict flow between the opposite sides of the control valve is sufficiently far away from the pilot passage so that it is minimally affected by differential pressure tending to move the actuator to a position blocking the pilot passage.

6. A control valve assembly designed to modulate fluid flow as desired between an inlet and outlet, as defined in claim 4, wherein the pilot passage is centrally positioned in the control valve, said secondary valve including an offset passage extending through the control valve and a pivotal valve selectively engageable with the secondary passage of the control valve, and spring means urging the pivotal valve assembly toward the secondary passage restricting flow from one side of the control valve to the other.

7. A control valve assembly designed to modulate fluid flow as desired between an inlet and outlet as defined in claim 6, wherein the spring means is a generally circular leaf type spring fixed at one end of the control valve and engaging the pivotal valve at its other end.

8. A control valve assembly designed to modulate fluid flow as desired between an inlet and outlet, as defined in claim 4, wherein the pilot passage is centrally positioned in the control valve, said secondary valve engageable with actuator including an offset passage extending through the control valve, a poppet valve, and means to urge poppet valve toward a position to selectively restrict the secondary valve passage to effect an equilibrium position of the control valve.

9. A control valve assembly designed to modulate fluid flow as desired between an inlet and outlet, as defined in claim 6, wherein the pivotal valve is pivoted at a fixed point with respect to the control valve to increase the mechanical advantage of the pivotal valve and reduce the force requirement of the actuator to operate the pivotal valve.

10. A control valve assembly designed to modulate fluid flow as desired between an inlet and outlet, comprising: housing means having an inlet and an outlet, a control valve reciprocably mounted in the valve housing and operable to control flow between the inlet and the outlet, a main valve seat in the housing selectively engageable by the control valve to control flow from the inlet to the outlet, a high pressure side of the control valve being in continuous communication with the inlet and the other side of the control valve exposed to an intermediate chamber, a pilot passage in the control valve connecting the intermediate chamber to the outlet, an armature/actuator moveably mounted in the housing having a pilot valve seal selectively engageable with the pilot passage to selectively block or open flow but not modulate flow through the pilot passage, an electromagnetic coil for producing a magnetic force to position the armature/actuator in accordance with the magnitude of current flow through its coil, and a secondary valve for selectively restricting flow between the inlet and intermediate chamber responsive to the position of the armature/actuator engaging the secondary valve to balance the pressure forces acting on the opposite sides of the control valve when the control valve arrives at a predetermined position with respect to the armature.

11. A control valve assembly designed to modulate fluid flow as desired between an inlet and outlet, as defined in claim 10, wherein said predetermined position of the armature/actuator pilot seal from the control valve spaces the pilot passage sufficiently far away from the pilot seal so the latter is unaffected by pressure differential forces acting across the pilot seal.

12. A control valve assembly designed to modulate fluid flow as desired between an inlet and outlet, as defined in claim 10, wherein the pilot passage is centrally positioned in the control valve, said secondary valve including an offset passage extending through the control valve, a pivotal valve selectively engageable with the secondary passage of the control valve, and spring means engaging the pivotal valve toward the secondary passage to restrict flow from one side of the control valve to the other.

13. A control valve assembly designed to modulate fluid flow as desired between an inlet and outlet, as defined in claim 10, wherein the pilot passage is centrally positioned in the control valve, said secondary valve including an offset passage extending through the control valve, a poppet valve and means to urge the poppet valve toward a position to selectively restrict the secondary valve passage to effect an equilibrium position of the control valve.

14. A control valve assembly designed to modulate fluid flow as desired between an inlet and outlet, as defined in claim 12, wherein the pivotal valve is pivoted at a fixed point with respect to the control valve to increase the mechanical advantage of the pivotal valve and reduce the force requirement of the actuator to operate the pivotal valve.

15. A control valve assembly designed to modulate fluid flow as desired between an inlet and outlet, as defined in claim 10, wherein the pilot passage is centrally positioned in the control valve, said secondary valve including an offset passage extending through the control valve and a pivotal valve selectively engageable with the secondary passage of the control valve and spring means engaging the pivotal valve toward the secondary passage to restrict flow from one side of the control valve to the other, the pilot passage being centrally positioned in the control valve, said secondary valve including an offset passage extending through the control valve and a pivotal valve selectively engageable with the secondary passage of the control valve as the actuator and the pivotal valve being pivoted at a fixed point with respect to the control valve to increase the mechanical advantage of the pivotal valve and reduce the force requirement of the actuator to operate the pivotal valve.

16. A mixing valve assembly for appliances requiring a mixture of hot and cold fluids, comprising: a first control valve assembly connected to a source of cold fluid including; housing means having an inlet and an outlet, a control valve reciprocably mounted in the valve housing and operable to control flow between the inlet and the outlet, pilot passage means through the control valve communicating the outlet with the opposite side of the control valve, an actuator reciprocably mounted in the housing having a valve seal selectively blocking or opening flow through the pilot passage, said actuator being movable to a plurality of positions, said actuator and control valve being constructed so the control valve follows infinitely the position of the actuator to variably control flow between the inlet and the outlet, and means for minimizing the tendency of the actuator to close the pilot passage inadvertently including means to control the differential pressure across the control valve separately from the actuator seal; a second control valve assembly connected to a source of hot fluid including; housing means having an inlet and an outlet, a control valve reciprocably mounted in the valve housing and operable to control flow between the inlet and the outlet, pilot passage means through the control valve communicating the outlet with the opposite side of the control valve, an actuator reciprocably mounted in the housing having a valve seal selectively blocking or opening flow through the pilot passage, said actuator being movable to a plurality of positions, said actuator and control valve being constructed so the control valve follows infinitely the position of the actuator to variably control flow between the inlet and the outlet, and means for minimizing the tendency of the actuator to close the pilot passage inadvertently including means to control the differential pressure across the control valve separately from the actuator seal; said outlets of the first and second valve assemblies being connected together so the hot and cold fluids mix in proportion to the extent of opening of their respective control valves, and means to independently control the position of each of the actuators in the first and second control valve assemblies.

17. A control valve assembly designed to modulate fluid flow as desired between an inlet and outlet, as defined in claim 16, wherein the mixing valve includes means for sensing the outlet temperature of either the hot or cold or of the combined mixture of the hot and cold fluid outlets, and said means for controlling the actuators being responsive to said sensing means.

18. A control valve assembly designed to modulate fluid flow as desired between an inlet and outlet as desired, as defined in claim 16, wherein each of the first and second control valve assemblies includes said means to control the differential pressure across the control valve and it includes a secondary valve selectively and variably restricting flow between the opposite sides of the control valve, the pilot passage being centrally positioned in the control valve, said secondary valve including an offset passage extending through the control valve, a pivotal valve selectively engageable with the secondary passage of the control valve, and spring means urging the pivotal valve toward the secondary passage to restrict flow from one side of the control valve to the other.

19. A control valve assembly designed to modulate fluid flow as desired between an inlet and outlet, as defined in claim 16, wherein each of the first and second control valve assemblies include means to control the differential pressure across the control valve and includes a secondary valve selectively and variably restricting flow between the opposite sides of the control valve, and a poppet valve, and means to urge the poppet valve toward a position to selectively restrict the secondary passage to effect an equilibrium position of the control valve.

20. A control valve assembly designed to modulate fluid flow as desired between an inlet and outlet as defined in claim 16, wherein each of the first and second control valve assemblies includes an electromagnetic coil for moving the actuator away from the control valve to open flow through the pilot passage, and a spring for urging the actuator toward the control valve toward a position to block flow through the pilot passage, and said electromagnetic coils magnetically positioning said actuators whereby the hot and colt control valves will follow the position of the actuators to variably control flow between the inlet and the outlet.

21. A control valve assembly designed to modulate fluid flow as desired between an inlet and outlet, comprising: housing means having an inlet and an outlet, a control valve reciprocably mounted in the valve housing and operable to control flow between the inlet and the outlet, pilot passage means through the control valve communicating the outlet with the opposite side of the control valve, an actuator reciprocably mounted in the fluid flow in the housing having a valve seal selectively blocking or opening flow through the pilot passage, said actuator being movable to a plurality of positions, said actuator and control valve being constructed so the control valve follows infinitely the position of the actuator to variably control flow between the inlet and the outlet, means for minimizing the tendency of the actuator to close the pilot passage inadvertently including means to control the differential pressure across the control valve separately from the actuator seal, an electromagnetic coil for moving the actuator away from the control valve to open flow through the pilot passage and a spring for urging the actuator toward the control valve toward a position to block flow through the pilot passage, and said electromagnetic coil positioning said actuator in accordance with the magnitude of current in its coil whereby the control valve will follow the position of the actuator to variably control flow between the inlet and outlet.

22. A control valve assembly designed to modulate fluid flow as desired between an inlet and an outlet, comprising: housing means having an inlet and an outlet, a control valve reciprocably mounted in the valve housing and operable to control flow between the inlet and the outlet, pilot passage means through the control valve communicating the outlet with the opposite side of the control valve, an actuator reciprocably mounted in the fluid flow in the housing having a valve seal selectively blocking or opening flow through the pilot passage, said actuator being movable to a plurality of positions, said actuator and control valve being constructed so the control valve follows infinitely the position of the actuator to variably control flow between the inlet and the outlet, means for minimizing the tendency of the actuator to close the pilot passage inadvertently including means to control the differential pressure across the control valve separately from the actuator seal, the means to control the differential pressure across the control valve including a secondary valve selectively and variably restricting flow between the opposite sides of the control valve.

* * * * *